United States Patent

[11] 3,557,750

| [72] | Inventor | James J. Gallagher<br>Chalfont, Pa. |
|---|---|---|
| [21] | Appl. No. | 741,466 |
| [22] | Filed | July 1, 1968 |
| [45] | Patented | Jan. 26, 1971 |
| [73] | Assignee | Standard Pressed Steel Co.<br>Jenkintown, Pa.<br>a corporation of Pennsylvania |

[54] APPARATUS FOR APPLYING A THERMOPLASTIC LOCKING PATCH ON A THREADED FASTENER
10 Claims, 3 Drawing Figs.

[52] U.S. Cl. ................................................. 118/308,
                                                          118/319
[51] Int. Cl. ................................................. B05b 7/24
[50] Field of Search............................................ 118/308,
                                          312, 319, 400, 318, 320

[56] References Cited
UNITED STATES PATENTS

| 2,919,160 | 12/1959 | Blackburn........................ | (118/400UX) |
| 2,921,555 | 1/1960 | Schwartz........................ | 118/308 |
| 3,000,752 | 9/1961 | Jackson et al. ................. | 118/308X |
| 3,291,630 | 12/1966 | Deyle et al...................... | 118/318X |
| 3,336,903 | 8/1967 | Point.............................. | (118/400UX) |
| 3,384,048 | 5/1968 | Kutcher......................... | 118/319X |
| 3,416,492 | 12/1968 | Greenleaf....................... | 118/308X |
| 3,452,714 | 7/1969 | Burke et al. ................... | 118/308X |

*Primary Examiner*—John P. McIntosh
*Attorneys*—Stanley Belsky and Curtis, Morris & Safford ABSTRACT: A finely powdered thermoplastic material is placed in a fluidizing chamber and is dispensed on a preheated threaded fastener element in controlled amounts by controlled air pulsations which pass through a venturi tube arrangement. The powdered material is deposited on the threaded surface in a predetermined amount and is fused thereto to provide a locking patch of solidified thermoplastic material.

PATENTED JAN 26 1971

3,557,750

INVENTOR.
JAMES J. GALLAGHER
BY
Curtis, Morris & Safford.
ATTORNEYS

APPARATUS FOR APPLYING A THERMOPLASTIC LOCKING PATCH ON A THREADED FASTENER

This invention relates to an apparatus and method for making self-locking threaded fasteners of the type having a locking patch of thermoplastic resin bonded to the undistorted thread surfaces. Self-locking threaded fasteners of the type having a locking patch of thermoplastic resin bonded to the thread surfaces have found wide commercial application. This widening commercial demand requires a manufacturing technique which allows a volume production in a rapid and economically feasible manner while maintaining high standards of quality for the finished product. U.S. Pat. No. 3,294,139 to Preziosi discloses a recent attempt at solving this problem wherein a measured quantity of powdered thermoplastic resin is placed on the thread surface of a fastener and heat is applied to melt the powder into a free-form liquid pool which is allowed to cool and solidify in such shape without deformation from extraneous pressures. This method has a number of manifest disadvantages including the difficulty of controlling the volume of powdered resin applied to the fastener and of directing the powder to, and confining it within, the desired area on the threaded surface. Examination of fasteners which have been produced employing this process under actual commercial conditions reveals wide variations in the size and shape of the resin patches, many having an uneven "lumpy" surface, or even a "spattered" appearance with portions of the resin being in the form of small droplets separate from the main resin body.

It is therefore among the objects of this invention to provide a novel method and apparatus to produce threaded fastener elements having a locking patch of thermoplastic resin bonded to the thread surfaces in a rapid, economically feasible manner. It is also among the objects of this invention to provide a method and apparatus for producing such threaded fastener elements wherein the volume of thermoplastic material applied to the threaded surfaces can be carefully and precisely controlled in order to insure uniform products. A still further object of the present invention is to provide a method and apparatus for producing such fastener elements wherein the locking patch of thermoplastic material is uniformly bonded to the thread surfaces to provide a strong bond so that shearing forces, applied during use of the fastener element, will not cause a rupture of the bond between the resin body and the thread surfaces and an impairment of the locking function.

Figure 1:
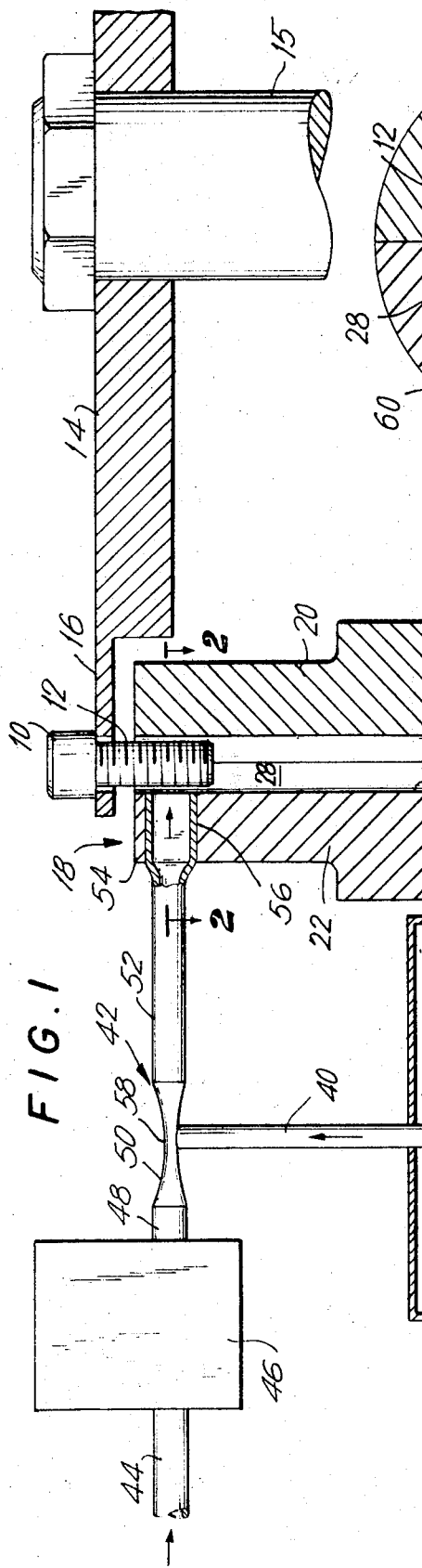
FIG. 1 is a schematic representation of the apparatus of the present invention.
Figure 2:
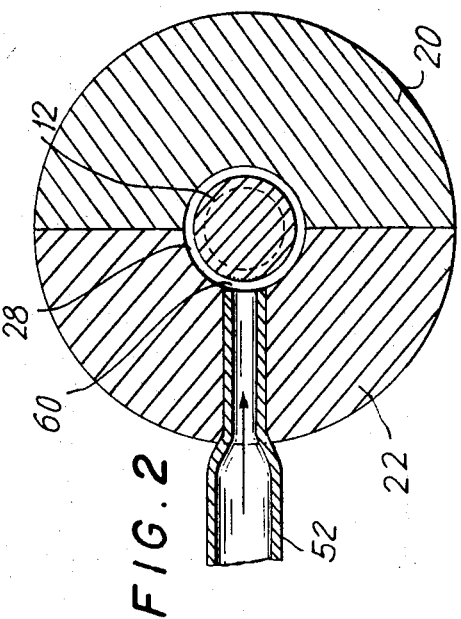
FIG. 2 is a horizontal, sectional view taken on line 2–2 of FIG. 1.

Referring now to the drawing, particularly FIGS. 1 and 2, a fastener element 10 having a threaded shank 12 is shown carried by a rotating indexing table 14. The table 14 includes a central support shaft 15 and a plurality of circumferentially spaced bolt retaining stations 16 which hold and retain the bolts in a vertical position. The table 14 is incrementally indexable and, as it indexes, the bolts 10 in the circumferentially spaced retaining stations 16 are first heated in an induction heating unit (not shown) to a temperature of 250° F. to 700° F. and then carried to a patch applying station 18 where the powdered thermoplastic resin, for example a polyamide (nylon) is applied.

Station 18 includes a pair of jaw chucks 20 and 22, respectively, each having a half-cylindrical channel 24 and 26, respectively, which, when the chucks 20 and 22 are in abutting relationship, define a cylindrical bolt shank receiving cavity 28 closely confining the threaded shank 12 of the bolt. The jaws 20 and 22 are selectively movable from a spaced apart relationship wherein, as table 14 indexes a bolt 10 to the station, the bolt is allowed to pass between the spaced jaw chucks, to a closed position, shown in FIG. 2, wherein the bolt is confined within the cavity 28.

The thermoplastic material which is to be deposited on a bolt shank 12 is stored, in finely powdered form, in a fluidizing chamber 30 where the powder, shown at 32, is maintained in an agitated and fluidized state by a forced circulation of air from air line 34 in the lower portion of chamber 30. The air passes through a porous membrane 35 which separates the upper portion 36 of chamber 30 from the air entry chamber 37. The air vibrator 38 in lower chamber 37 disperses the stream of air entering through line 34 so that it circulates uniformly and passes through membrane 35 to uniformly agitate and fluidize the finely divided particles of thermoplastic material 32.

A tube 40 communicating with the upper chamber 36 directs the fluidized thermoplastic material from the chamber 36 to a powder delivery system 42 which in turn directs the thermoplastic material to the bolt shank 12, as will be explained more fully hereinbelow. Delivery system 42 includes an initial airflow line 44 from a pressurized air supply (not shown) which passes the air through a pulsating air valve 46 designed to allow discrete pulses of air from line 44 to pass through a predetermined timed intervals and in a predetermined volume. The pulsating air from the discharge of valve 46 enters discharge line 48 which leads to a venturi nozzle 50 and from there through delivery tube 52 to the bolt shank 12. Delivery tube 52 is housed in an aperture 54 in jaw chuck 22 and is pinched, as at 56, into a substantially elliptical shape in order to deliver the thermoplastic powdered material in a vertically elongated pattern on the bolt shank 12.

Tube 40 intersects the venturi nozzle at the throat 58 where, as the pulsating airstream approaches the throat, the velocity increases and the throat pressure decreases. The decrease in throat pressure creates a partial vacuum effect which sucks up a portion of the fluidized powdered thermoplastic material and entrains this material in the airstream to be delivered through line 52 to the bolt shank 12. The duration of the air pulse and the volume of pulsed air is carefully controlled in order to accurately control the volume of powdered thermoplastic material entrained.

The shape of the delivery section 56 and the clearance 60 (see FIG. 2) are selected to be compatible with the precisely metered amount of fluidized thermoplastic material delivered by each pulsation so that the dispersal of the powdered material on the bolt shank 12 is uniformly tapered from a minimum thickness at the edges to a maximum thickness at the center. As the pulsating blast of carrier air impinges on the bolt shank, the powdered thermoplastic material entrained therein disperses slightly outwardly from the exit tube 56 so that while the main concentration of the powdered material is directed toward the bolt shank 12, in the area immediately opposite the longitudinal central portion of the elliptical delivery tube 52, the dispersal of the carrier air outward from delivery tube 52 carries a portion of the thermoplastic material away from the longitudinal central concentration so that the patch of thermoplastic material ultimately includes a peripheral edge of minimum concentration building up toward a more highly concentrated central portion. Thus, when the bolt is in use and engages a female threaded fastener element, the bite of the initial engagement of the patch with the roots of the female threaded fastener element does not dislodge the thermoplastic material bonded to the bolt shank. Engagement is gradual and avoids excessive initial shearing forces which may tend to rupture the bond of thermoplastic material with the bolt shank.

Figure 3:
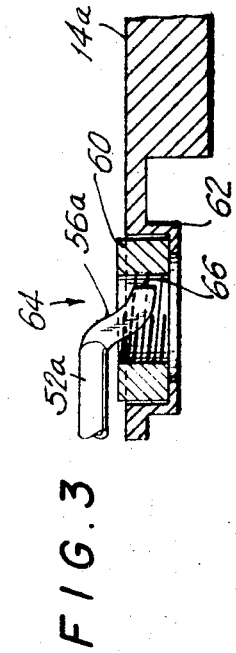
FIG. 3 is a detailed vertical section showing an alternate embodiment of the present invention adapted for female fastener elements.

FIG. 3 shows an alternate embodiment of the present invention wherein the fluidized thermoplastic material is directed to impinge on the thread surface of a female threaded fastener. In this embodiment, the female threaded fastener elements or nuts 60 are carried in spaced retaining trays 62 on an indexing table 14a which is incrementally indexable to a thermoplastic depositing station 64. A delivery tube 52a from a fluidizing chamber and venturi nozzle, as described above, is positioned parallel to, and just above, the nut 60 on the indexing table 14a.

The delivery segment 56a is downwardly inclined so that when a nut 60 is in the depositing station 64 the outlet portion 66 of the delivery tube 56a is adjacent the threaded surfaces of the nut. The indexing table 14a is provided with a camming mechanism (not shown) to elevate the table each time a nut 60 is in the depositing station 64. Once the charge of fluidized powder has been deposited on the nut 60 by the pulsating air stream, the table drops, indexes another nut into the station, and is elevated by the camming mechanism to put the next nut adjacent the delivery system. It is to be understood that other nut elevating devices can be employed, for example a piston immediately below depositing station 64 can selectively elevate each nut 60 in the depositing station prior to the pulse of fluidized thermoplastic material.

In both of the embodiments described above the fastener element is preheated before it reaches the fluidized powder depositing station so that as the powdered thermoplastic material impinges on the thread surfaces the particles melt and adhere to the heated threaded surfaces.

It is thus seen that by the process and apparatus of the present invention a locking patch of thermoplastic material is deposited upon the threaded surfaces of a fastener element. The volume of thermoplastic material deposited on the threaded surfaces is precisely controlled and is uniformly dispersed upon the threaded surfaces and fused thereto in such manner as to create evenly contoured and uniform patches. The process is particularly adaptable to high speed production line applications and results in products of uniformly high quality.

The specific embodiments detailed herein are by way of illustration only and are not intended to be exhaustive, as those skilled in the art may adapt the teachings of the present invention in other embodiments each as may be best suited for their particular purposes.

I claim:

1. An apparatus for depositing a patch of thermoplastic material on the thread surface of a threaded fastener element comprising:
   support means for retaining a plurality of threaded fastener elements and for sequentially transporting said fastener elements to a plastic application station;
   a fluidizing chamber for fluidizing finely powdered thermoplastic material;
   means to extract a predetermined quantity of said fluidized thermoplastic material from said chamber; and
   a delivery system to direct said predetermined quantity of thermoplastic material to the thread surface of a threaded fastener element, said delivery system including a discharge tube including a portion having a generally elliptical cross section which terminates at said plastic application station in close proximity to said support means whereby a generally elongated patch of said thermoplastic material is deposited on the thread surface of the threaded fastener element located at said plastic application station.

2. Apparatus as defined in claim 1 wherein said delivery system includes:
   a source of carrier fluid under pressure; and
   a pulsating fluid valve to admit periodically a predetermined volume of said carrier fluid for a predetermined duration into said delivery system thereby to entrain said thermoplastic material in discrete, timed pulsations.

3. Apparatus as defined in claim 2 wherein said carrier fluid is a gas, said delivery system includes a venturi nozzle to increase the velocity and reduce the pressure of said pulse of carrier gas, and said means to extract a predetermined quantity of thermoplastic material includes a fluid communication line from said chamber to the throat of said nozzle whereby as said pulse of carrier gas passes through said nozzle throat said predetermined quantity of thermoplastic material is extracted and entrained.

4. Apparatus as defined in claim 3 wherein said fluidizing chamber includes an upper material storage chamber and a lower air dispersion chamber separated by a porous membrane, said lower chamber including an air entry line to admit air under pressure thereby to activate said thermoplastic material in said upper material storage chamber and maintain said thermoplastic material therein in a fluidized state and vibrator means in said lower chamber to evenly distribute the air from said line upward through said membrane into said upper material storage chamber.

5. Apparatus as defined in claim 2 wherein said means retaining a plurality of threaded fastener elements, includes means to index said threaded fastener elements serially to a patch-applying station, said indexing means being coordinated with the periodic pulsation of carrier fluid whereby successive ones of said fastener elements are indexed into said patch-applying station there to receive on a portion of the threaded surface said predetermined quantity of thermoplastic material entrained in said pulsation of carrier fluid.

6. Apparatus as defined in claim 1 wherein said plastic application station includes a pair of relatively movable jaw chucks adapted to confine the thread surface of the threaded fastener element located in said patch-applying station and wherein said portion of said discharge tube having an elliptical cross section extends through one of said jaw chucks.

7. Apparatus as defined in claim 1 wherein said support means includes a tray including a plurality of recesses each adapted to receive a threaded fastener element and wherein said portion of said discharge tube having an elliptical cross section extends downwardly into the recess located at said plastic application station.

8. An apparatus for applying a patch of thermoplastic material on a portion of the threaded surface of a threaded fastener element comprising:
   an indexable threaded fastener-retaining support having a plurality of fastener-retaining stations, said support adapted to index, at predetermined intervals, a fastener element in each said station to a patch-applying station;
   means for agitating finely powdered thermoplastic material into a fluidized state;
   means to meter a predetermined quantity of said fluidized material at discrete timed intervals; and
   means to deliver said predetermined quantity of fluidized material to the thread surface of a fastener element in said patch-applying station, said delivery means including a discharge tube including a portion having a generally elliptical cross section which terminates at said patch-applying station in close proximity to said threaded fastener-retaining support, whereby a generally elongated patch of said thermoplastic material is deposited on the thread surface of the threaded fastener element in said patch-applying station.

9. Apparatus as defined in claim 8 wherein said means to meter a predetermined quantity of fluidized material includes:
   a source of pressurized air;
   a pulsating valve adapted to admit pulses of air from said pressurized source, said pulses being for a predetermined duration and having a predetermined volume;
   a venturi nozzle in fluid communication with said valve and adapted to receive said air pulsations;
   a delivery line having one end in fluid communication with the throat of said venturi nozzle and its other end in fluid communication with said fluidized thermoplastic material whereby when a pulse of air passes through said nozzle the throat pressure of said nozzle is decreased thereby creating a partial vacuum which extracts said predetermined quantity of thermoplastic material thereby to entrain said predetermined quantity of material in said pulse of air.

10. An apparatus for depositing a patch of thermoplastic material on the thread surface of a threaded fastener element comprising:
   a fluidizing chamber for fluidizing finely powdered thermoplastic material;
   means to extract a predetermined quantity of said fluidized thermoplastic material from said chamber;

a delivery system to direct said predetermined quantity of thermoplastic material to the thread surface of a threaded fastener element, said delivery system including a source of carrier fluid under pressure;

a pulsating fluid valve to admit periodically a predetermined volume of said carrier fluid for a predetermined duration into said delivery system, thereby to entrain said thermoplastic material in discrete, timed pulsations;

means to accommodate a plurality of threaded fastener elements including means to index said threaded fastener elements serially to a patch-applying station, said indexing means being coordinated with the periodic pulsation of said carrier fluid whereby successive ones of said fastener elements are indexed into said patch-applying station there to receive on a portion of the threaded surface said predetermined quantity of thermoplastic material entrained in said pulsation of carrier fluid; and said threaded fastener elements being bolts and said patch-applying station including a pair of movable jaw chucks, each said jaw chuck having an opposed facing channel portion therein defining, when said jaw chucks are in abutting relation, a bolt-shank-receiving cavity, said jaw chucks being movable from a first open position to allow passage of a bolt shank therebetween, as said bolts are indexed, to a closed abutting position when a bolt is at said patch-applying station wherein said bolt shank is closely confined within said bolt shank receiving cavity, and said delivery system includes a discharge tube housed within an aperture in one of said jaw chucks and oriented such that the discharge of said predetermined quantity of thermoplastic material is directed to a portion of a bolt shank.